United States Patent
Zhang et al.

(10) Patent No.: US 11,232,346 B2
(45) Date of Patent: Jan. 25, 2022

(54) SPARSE VIDEO INFERENCE PROCESSOR FOR ACTION CLASSIFICATION AND MOTION TRACKING

(71) Applicant: The Regents of The University of Michigan, Ann Arbor, MI (US)

(72) Inventors: Zhengya Zhang, Ann Arbor, MI (US); Ching-En Lee, Ann Arbor, MI (US); Chester Liu, Ann Arbor, MI (US); Thomas Chen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 905 days.

(21) Appl. No.: 16/000,157

(22) Filed: Jun. 5, 2018

(65) Prior Publication Data

US 2018/0349764 A1    Dec. 6, 2018

Related U.S. Application Data

(60) Provisional application No. 62/515,683, filed on Jun. 6, 2017.

(51) Int. Cl.
| | |
|---|---|
| *G06N 3/063* | (2006.01) |
| *G06K 9/00* | (2006.01) |
| *G06N 5/04* | (2006.01) |
| *G06N 3/08* | (2006.01) |
| *G06N 3/04* | (2006.01) |

(Continued)

(52) U.S. Cl.
CPC ......... *G06N 3/063* (2013.01); *G06K 9/00718* (2013.01); *G06K 9/6271* (2013.01); *G06N 3/049* (2013.01); *G06N 3/0445* (2013.01); *G06N 3/088* (2013.01); *G06N 5/04* (2013.01); *G06K 2009/4695* (2013.01)

(58) Field of Classification Search
CPC ........ G06N 3/063; G06N 3/0445; G06N 5/04; G06N 3/088; G06N 3/049; G06K 9/6271; G06K 9/00718; G06K 2009/4695
See application file for complete search history.

(56) References Cited

U.S. PATENT DOCUMENTS

| | | | |
|---|---|---|---|
| 9,082,079 B1 * | 7/2015 | Coenen | G06N 3/08 |
| 2013/0325766 A1 | 12/2013 | Petre et al. | |

OTHER PUBLICATIONS

M. Baccouche et al "Spatio-Temporal Convolutional Sparse Auto-Encoder For Sequence Classification"; www.bmva.org/bmvc/2012/BMVC/paper 124/paper 124 (2012).

(Continued)

*Primary Examiner* — Jianxun Yang
(74) *Attorney, Agent, or Firm* — Harness, Dickey & Pierce, P.L.C.

(57) ABSTRACT

A sparse video inference chip is designed to extract spatio-temporal features from videos for action classification and motion tracking. The core is a sparse video inference processor that implements recurrent neural network in three layers of processing. High sparsity is enforced in each layer of processing, reducing the complexity by two orders of magnitude and allowing all multiply-accumulates (MAC) to be replaced by select-accumulates (SA). The design is demonstrated in a 3.98 mm2 40 nm CMOS chip with an Open-RISC processor providing software-defined control and classification.

28 Claims, 9 Drawing Sheets

(51) Int. Cl.
　　　*G06K 9/62*　　　(2006.01)
　　　*G06K 9/46*　　　(2006.01)

(56) References Cited

OTHER PUBLICATIONS

P. Dollár, et al "Behavior Recognition Via Sparse Spatio-Temporal Features" 2nd Joint IEEE International Workshop on Visual Surveillance and Performance Evaluation of Tracking and Surveillance (2005).

S. Nishimoto et al "A Three-Dimensional Spatiotemporal Receptive Field Model Explains Responses of Area MT Neurons to Naturalistic Movies" Journal of Neuroscience, 31 (41) (Oct. 12, 2011).

* cited by examiner

SPARSE VIDEO INFERENCE PROCESSOR FOR ACTION CLASSIFICATION AND MOTION TRACKING

CROSS-REFERENCE TO RELATED APPLICATIONS

This application claims the benefit of U.S. Provisional Application No. 62/515,683, filed on Jun. 6, 2017. The entire disclosure of the above application is incorporated herein by reference.

GOVERNMENT CLAUSE

This invention was made with government support under Grant No. HR0011-13-2-0015 awarded by the Defense Advanced Research Projects Agency. The Government has certain rights in this invention.

FIELD

The present disclosure relates to a sparse video inference processor for action classification and motion tracking.

BACKGROUND

Sparse coding is a class of unsupervised machine learning algorithms that attempt to both learn and extract the unknown features that exist within an input dataset under the assumption that any given input can be described by a sparse set of features that it learns. Sparse coding helps reduce the search space of the classifiers by modeling high-dimensional data as a combination of only a small number of active features and, hence, can reduce the computation required for classification. Sparse coding can be implemented in a recurrent network of spiking leaky integrate-and-fire neurons, where a neuron's potential increases due to input excitation, known as potentiation, and decreases due to inhibition by neighboring neurons. In this disclosure, a sparse coding algorithm, called locally competitive algorithm (LCA), is considered for inference. The LCA algorithm is described by equation (1).

$$\Delta u = \eta [\Phi^T x - (\Phi^T \Phi - I)a - u]$$

$$a = T_\lambda(u) \quad (1)$$

where u is the neuron potential, $\Delta u$ is the potential update; $\eta$ is the update step size; $\Phi$ is the receptive fields (RF) of neurons, also known as the dictionary; x is the input; a is the neuron activation; and I is the identity matrix. $T_\lambda(\ )$ is a binary threshold function and it outputs 1 if its input exceeds $\lambda$, or 0 otherwise. The threshold $\lambda$ is learned from training data using an optimization method, such as stochastic gradient descent, to maximize encoding accuracy and sparsity of neuron activations, i.e., number of zeros in neuron activations. While reference is made to LCA, other sparse coding algorithms are also contemplated by this disclosure.

In performing inference on video inputs, an input is divided to 3D segments for processing. For example, x is a series of T X×Y×D consecutive and overlapping video segments, as shown in FIG. 1. The dictionary $\Phi$ is a collection of N receptive fields, and each receptive field is a X×Y×D spatio-temporal feature, known as spatio-temporal RF (STRF). u, $\Delta u$, and a are collections of N neurons' potentials, potential updates, and activations, respectively, over T time steps. Mathematically, x is a V×T matrix, where V=XYD; $\Phi$ is a V×N matrix; u, $\Delta u$ and a are N×T matrices.

The inference described by equation (1) consists of four functional steps: charge, compete, leak and activate. In the charge step, input x is projected to the feature space as described by $\Phi^T x$. The projection can be understood as encoding the input x in STRFs, i.e., extracting STRFs from the input. The projection increases, or charges, the neuron potential.

To maintain sparse activation, active neurons suppress other neurons in the compete step. The inhibition weight between a pair of neurons is computed by correlating their STRFs, i.e., $\Phi^T \Phi$. Self inhibition is removed by subtracting I. The closer the two neurons' STRFs, the stronger the inhibition between the two neurons. Neuron activations trigger inhibitions as described by $-(\Phi^T \Phi - I)a$.

In the leak step, neuron potential decreases over time, and the leakage is proportional to the potential. In the activate step, neuron potential is thresholded to generate binary spikes.

The four steps above constitute one iteration of inference. Given an input x, the inference is preferably done by iterating the four steps until convergence. It is common to use a fixed number of iterations I. The baseline implementation is illustrated in FIG. 2, where the leak step is omitted for simplicity.

The implementation complexity of one iteration of inference is analyzed and the results are listed below in Table 1. The dictionary storage requires VN entries. The inhibitory weights are computed by $\Phi^T \Phi - I$. The $N^2$ weights can be computed once and stored in memory.

TABLE I

| Function | Storage (# weights) | Compute (# MACs) |
|---|---|---|
| Dictionary storage | V N | — |
| Inhibitary weight storage | $N^2$ | — |
| Charge step | — | NVT |
| Compete step | — | $N^2 TI$ |
| Total | V N + $N^2$ | NVT + $N^2 TI$ |

In every iteration of inference, the charge step requires NVT MACs. The step is done one per inference, and the result accumulated in subsequent iterations of the inference. The compete step is driven by neuron activations, requiring $N^2 T$ MACs per iteration for I iterations.

Typically the number of neurons (N) ranges from hundreds and more for practical applications and video inference can be particularly challenging due to its large dimensionality, size and STRFs. A realistic implementation calls for a large chip size and a high processing power.

This section provides background information related to the present disclosure which is not necessarily prior art.

SUMMARY

This section provides a general summary of the disclosure, and is not a comprehensive disclosure of its full scope or all of its features.

A video inference processor is presented that extracts features from a video. The video inference processor includes a residual layer, a charge layer and an activation layer as well as a plurality of neurons. The plurality of neurons are interconnected to form a recurrent neural network implemented in hardware, such that each neuron is configured to store in memory a receptive field. The residual layer is configured to receive a video input and output from an activation layer. During operation, the residual layer reconstructs the video input from the output from the activation layer, subtracts the reconstructed input from the video input to yield a residual and quantizes values of the residual. The charge layer is configured to receive the quantized values of the residual from the residual layer and operates to project the quantized values of the residual onto the plurality of receptive fields, thereby yielding potential update values for the plurality of neurons. The activation layer is configured to receive the potential update values for the plurality of neurons from the charge layer and operates to accumulate the potential update values and threshold potential values for the plurality of neurons to generate a set of binary outputs, wherein the set of binary outputs is fed back to the residual layer.

In one aspect, the residual layer reconstructs the input video using only select accumulate operations and without multiplication operations. For example, the residual layer is implemented in hardware using multiplexers, adders and registers. Likewise, the charge layer projects quantized values of the residual into the plurality of receptive fields using only select accumulate operations and without multiplication operations. The charge layer may also be implemented in hardware using multiplexers, adders and registers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Video data is large, but it also contains high redundancy, especially from frame to frame. The redundancy offers opportunities for significant complexity reduction in storage and compute through compression and rectification. While reference is made throughout this disclosure to video input, the broader aspects of the classification scheme are applicable to other types of inputs as well.

In this disclosure, the LCA equation is reformulated by factoring the term $\Phi^T$ in (1).

$$\Delta u = \eta[\Phi^T(x-\Phi a)+a-u]$$

$$a = T_\lambda(u) \tag{2}$$

The reformulated inference can be interpreted as having four steps: residual, charge, leak and activate. The leak and activate steps are identical to the original formulation. The residual and charge steps are described below.

1) Residual: The input x is reconstructed, $\hat{x}=\Phi a$. The reconstruction is subtracted from the input to obtain the residual $r=x-\hat{x}$.
2) Charge: The residual is projected to the feature space, $c=\Phi^T r$.

The residual form of the LCA equation removes the storage of inhibitory weights and replaces it by computing inhibitory weights on the fly. As a result, the storage required is smaller, but the compute complexity poses a significant challenge, as shown in Table II below.

TABLE II

| Function | Storage (# weights) | Compute (# MACs) |
|---|---|---|
| Dictionary storage | V N | — |
| Residual step | — | NVTI |
| Charge Step | — | NVTI |
| Total | V N | 2NVTI |

To reduce the compute complexity, a min/max rectification is applied to the residuals to quantize the residuals to ternary spikes as shown below.

$$\Delta u = \eta[\Phi^T T_{\lambda_r}(x - \Phi_a) + a - u] \tag{3}$$

$$T_{\lambda r(x)} = \begin{cases} 1 & x \geq \lambda_r \\ 0 & \lambda_r > x > -\lambda_r \\ -1 & x \leq \lambda_r \end{cases}$$

$$a = T_\lambda(u),$$

The residual rectification is done by applying thresholds of $\lambda_r$ and $-\lambda_r$ to quantize the residuals to 1, 0, and −1. Similar to how the threshold $\lambda$ is learned from training, the threshold $\lambda_r$ can also be learned from training using the same optimization method. The optimization is formulated to maximize sparse encoding accuracy and sparsity of residuals, i.e., number of zeros in residuals.

A key advantage of quantizing the residuals to binary or ternary spikes is that the multiplication by these quantized values followed by accumulation, which is needed in the charge step, no longer requires an expensive multiplier.

Figure 1:
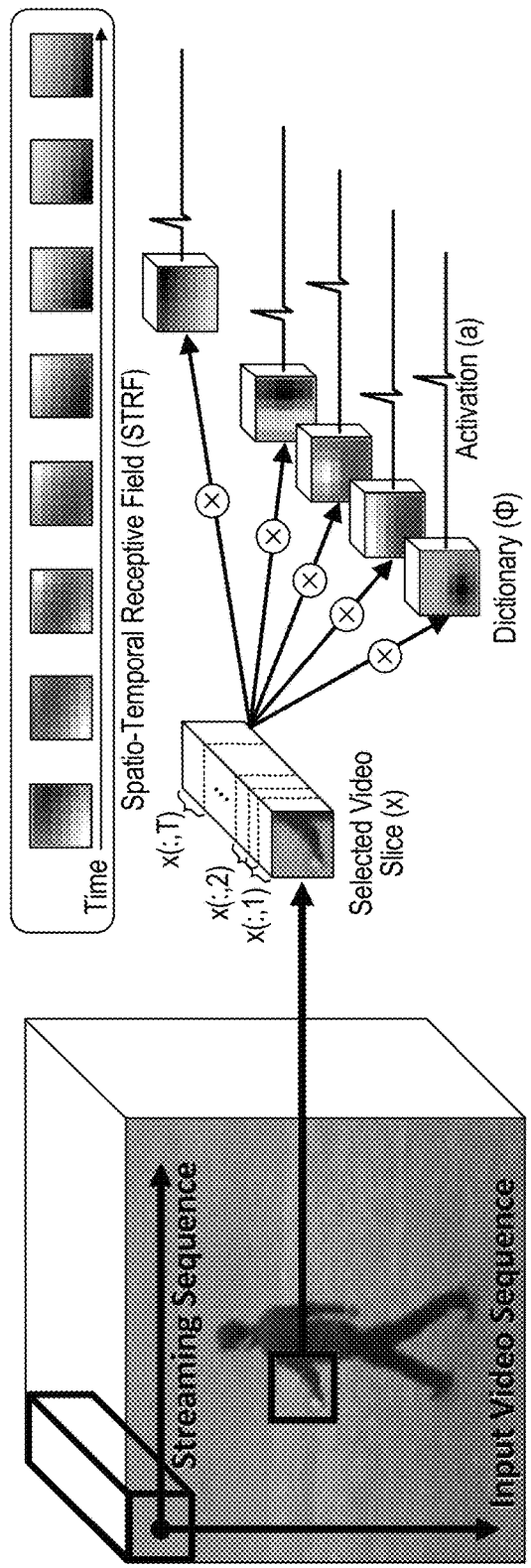
FIG. 1 is a diagram illustrating video inferences processing.
Figure 2:
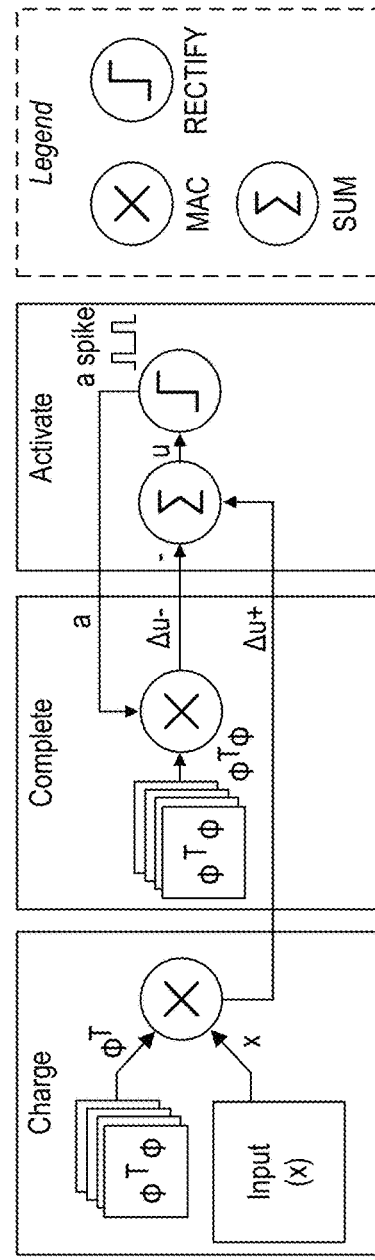
FIG. 2 is a block diagram showing a conventional implementation of video inference.
Figure 3A:
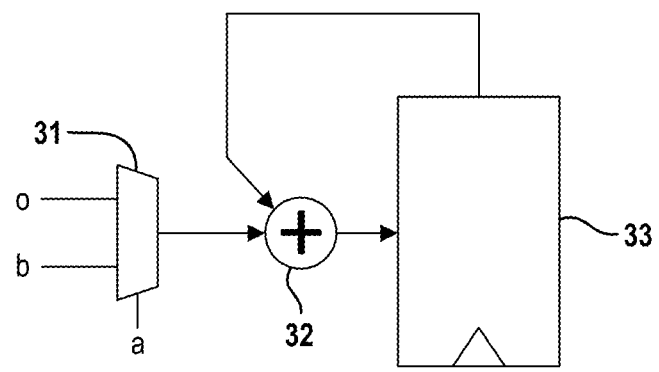
FIGS. 3A and 3B are schematics of example hardware implementations for a select-accumulate operation.
Figure 3B:
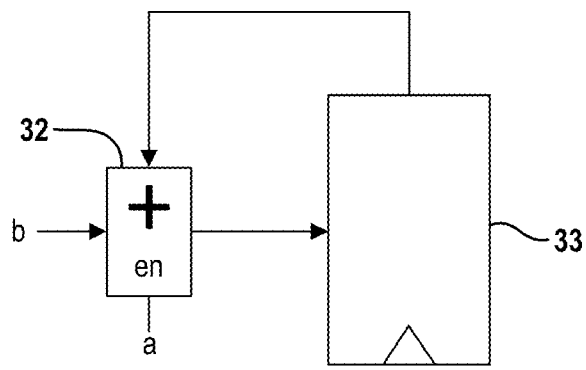

Instead, a simpler select-accumulate (SA) can be used. For example, suppose a is a binary (0 or 1), multiplying a by b followed by accumulation can be done using an SA that is implemented using a select-add as shown in FIG. 3A. In this example, the select-add operation is implemented in hardware using a multiplexer 31, an adder 32 and a register 33. a is used as the select input in the multiplexer 31 to choose whether 0 (if a is 0) or b (if a is 1) is accumulated by the adder 32. The accumulated sum is saved in a register 33. Alternatively, SA can be implemented in hardware using a skip-add shown in FIG. 3B, where a is used as the enable input to the adder 32 to decide whether to accumulate b (if a is 1) or 0 (if a is 0). An SA does not require a multiplier, a significant simplification over a MAC. Note that although the example was shown for the binary spike case, the implementation can be easily modified to support ternary spikes.

The residuals tend to reduce in magnitude over iterations, resulting in increasing sparsity over time in an inference. By appropriately choosing $\lambda_r$, the residuals can be further sparsified. By appropriately designing hardware to take advantage of sparsity, significant performance improvement and power savings can be achieved.

Similar to the residual rectification, neuron activation can be viewed as the rectification of neuron potentials to produce sparse, binary spikes. Binary spikes allow the reconstruction in the residual step to be implemented using SAs, presenting another opportunity for significant complexity and power reduction.

TABLE III

| Function | Storage (# weights) | Compute (# MACs) |
|---|---|---|
| Dictionary storage | V N | — |
| Residual step | — | $NVTS_aI$ |
| Charge Step | — | $NVTS_rI$ |
| Total | V N | $NVT (S_a + S_r)I$ |

Figure 4:
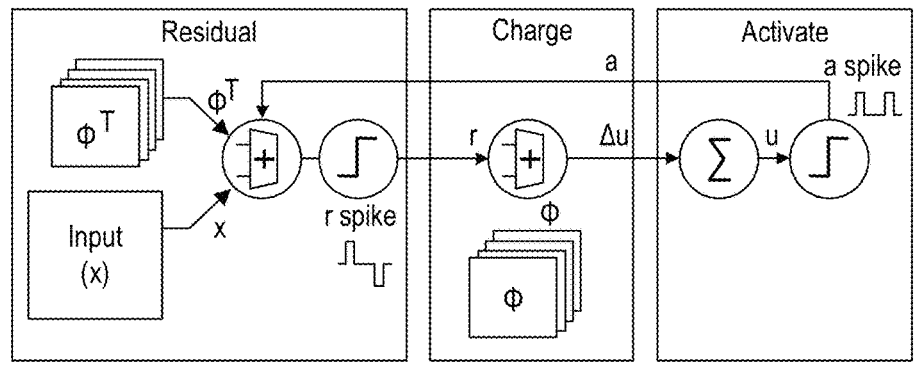
FIG. 4 is a block diagram showing a sparse, all-spiking implementation of video inference.

Taking advantage of both residual rectification and neuron activation, the sparse, all-spiking approach can be implemented as shown in FIG. 4. It features a lower complexity compared to the conventional residual approach as summarized above in Table III, where $S_a$ and $S_r$ refer to the density, or fraction of nonzero entries, in neuron activations and residuals, respectively. Compared to Table II, the two key advantages are the replacement of MACs by more efficient SAs, and the reduction of the operations enabled by sparsity.

Figure 5:
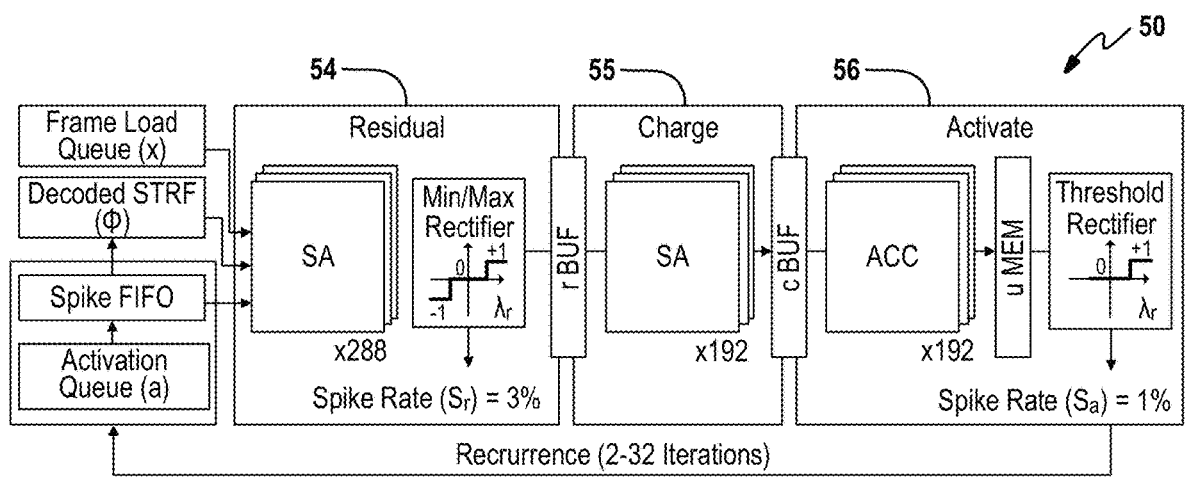
FIG. 5 is a block diagram of an example embodiment of a video inference processor.

With reference to FIG. 5, a video inference processor 50 is presented based on the on the sparse, all-spiking LCA approach. The video inference processor 50 is configured to receive a video input. In one embodiment, the video input is a time series of video segments taken from a video. For example, video inputs are in 6×6×64 slices, and a slice is further divided to 57 6×6×8 (T=57, V=6×6×8=288) consecutive and overlapping segments for processing. The values for the video input are presented only to describe one particular embodiment that has proven effective and should be viewed as illustrating, rather than limiting, the present disclosure.

The video inference processor 50 includes a plurality of neurons interconnected to form a recurrent neural network. Each neuron in the plurality of neurons is implemented in hardware. Each neuron is configured to store in memory a receptive field which represents a possible feature in a video. The plurality of receptive fields are collectively referred to as a dictionary. Likewise, in the example embodiment, each receptive field represents a time series of video segments of similar size to the video inputs. In the example embodiment, the video inference processor 50 uses a dictionary of 192 STRFs (N=192), each of size 6×6×8, to encode video slices using the STRFs. STRF weights are quantized to 8 bits. Based on the STRFs extracted from video, classification tasks, such as action classification, can be performed.

In one example embodiment, 54 KB memory is needed on the chip to store the dictionary. The density of neuron activations and residuals can be optimally set to $S_a=1\%$ and $S_r=3\%$, respectively, in processing the KTH Human Action Dataset, to maximize sparsity without sacrificing action classification accuracy. The number of iterations is tunable up to 32. The sparse, all-spiking approach reduces the number of operations per inference from approximately 200M MACs to 4M SAs, which translates to a significant reduction in complexity and power consumption.

The video inference processor 50 is further comprised of three layers: residual layer 54, charge layer 55 and activation (activate) layer 56. That is, the residual step is mapped to the residual layer; the charge step is mapped to the charge layer (the leak step is absorbed as part of the charge layer); and the activate step is mapped to the activation layer. The residual layer and the charge layer are the workhorse of the video inference processor 50. Each layer is nonblocking, and data is streamed through the residual layer, the charge layer, the activation layer and back to the residual layer for the next iteration.

The residual layer 54 is configured to receive a video input (in the initial iteration of an inference) as well as output from the activation layer 56 (in subsequent iterations of an inference). Briefly, the residual layer 54 reconstructs the video input from the output from the activation layer 56. More specifically, the residual layer 54 reconstructs the video input by summing the receptive fields that are activated in the output from the activation layer. It is noted that the residual layer 54 reconstructs the input video using only select accumulate operations and without multiplication operations. The residual layer 54 then subtracts the reconstructed input from the video input to yield a residual and quantizes values of the residual.

The charge layer 55 is configured to receive the quantized values of the residual from the residual layer 54. The charge layer 55 operates to project the quantized values of the residual onto the plurality of receptive fields and thereby yield potential update values for the plurality of neurons. Likewise, the charge layer 55 projects quantized values of the residual onto the plurality of receptive fields using only select accumulate operations and without multiplication operations. In one embodiment, the charge layer 55 compresses the quantized values of the residual by aggregating quantized values of a given pixel across video segments as further described below.

The activation layer 56 is configured to receive the potential update values for the plurality of neurons from the charge layer 55. The activation layer 56 operates to accumulate the potential update values and threshold potential values for the plurality of neurons to generate a set of binary outputs. The set of binary outputs are in turn fed back to the residual layer for the next iteration of processing. Further details for the example embodiment are provided below.

The dictionary $\Phi$ and its transpose $\Phi^T$ are accessed by the residual layer and the charge layer, respectively. Since the residual layer and the charge layer operate concurrently in a streaming pipeline and the dictionary elements' access orders are different, both $\Phi$ and $\Phi^T$ are stored on chip, requiring 108 KB of memory in the example embodiment. Due to the high access bandwidth needed for highly parallel processing, the dictionary memory is divided into banks, sacrificing the storage efficiency. In the example embodiment, the dictionary memory occupies 2.5 mm² chip area in a 40 nm CMOS technology.

Figure 6A:
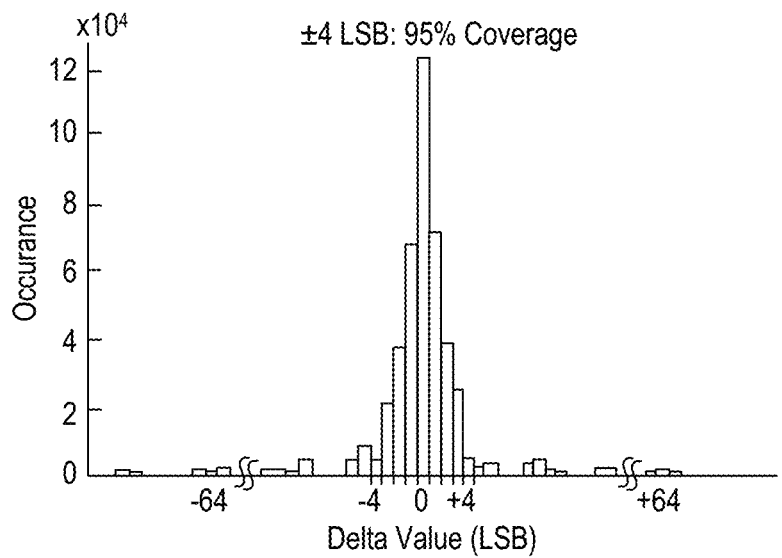
FIG. 6A is a graph showing the distribution of deltas between frames of STRFs.

In the example embodiment, each dictionary element is a 6×6×8 8-bit STRF that is essentially a sequence of 8 6×6 frames. Redundancy exists between consecutive frames, making it possible to compress each STRF to save memory, chip size and power. In FIG. 6A, the distribution of the pixel-by-pixel differences between consecutive frames of STRFs that are learned by training on the KTH Dataset is plotted. The results show that 95% of the pixel-by-pixel differences cover a narrow range of only 4 LSBs.

The similarity between consecutive frames makes it possible to delta encode of STRFs by storing the first 6×6 8-bit frame as the anchor frame, and subsequent frames as 4-bit pixel-by-pixel deltas to the previous frame. The delta encoding reduces the dictionary storage by 43%.

Figure 6B:
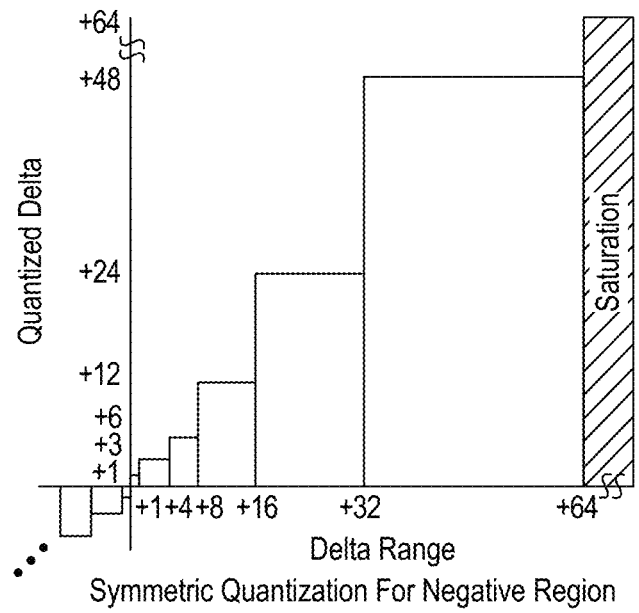
FIG. 6B is a graph showing the non-uniform quantization of deltas.

Although 4 bits are sufficient to cover 95% of the deltas, a better result requires a larger range. To keep deltas to 4 bits while increasing the range of coverage, non-uniform quantization of deltas is proposed as shown in FIG. 6B. The non-uniform quantization is specifically tailored to the delta distribution: smaller quantization step sizes are used at the lower end, and increasingly larger quantization step sizes are used towards the higher end to limit the number of quantization steps. The non-uniform quantization introduces a small overhead, as comparators are needed to perform the quantization and a table lookup is needed to recover a non-uniform quantized delta to the linear domain. Nonetheless, the overhead of this simple conversion is low, justifying the use of non-uniform quantization to save memory.

Figure 6C:
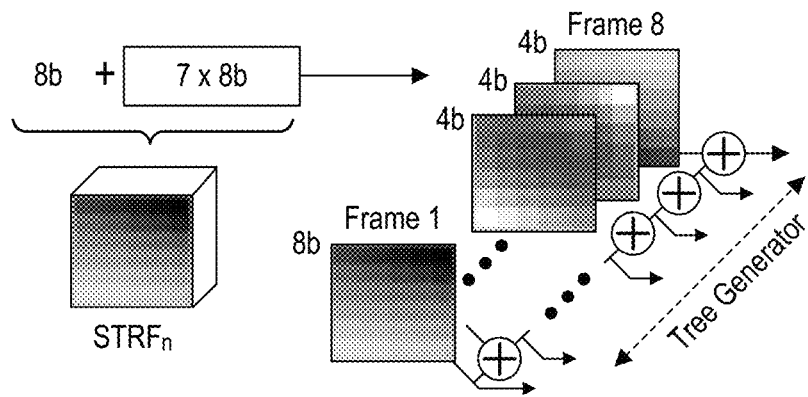
FIG. 6C is a diagram for a tree generator that is decompressing delta-encoded STRF.

The delta-encoded dictionary elements need to be decompressed before being used in computations with reference to FIG. 6C, a tree generator is employed to take the anchor frame as the base, and sequentially add the deltas to recover the remaining frames.

Figure 7:
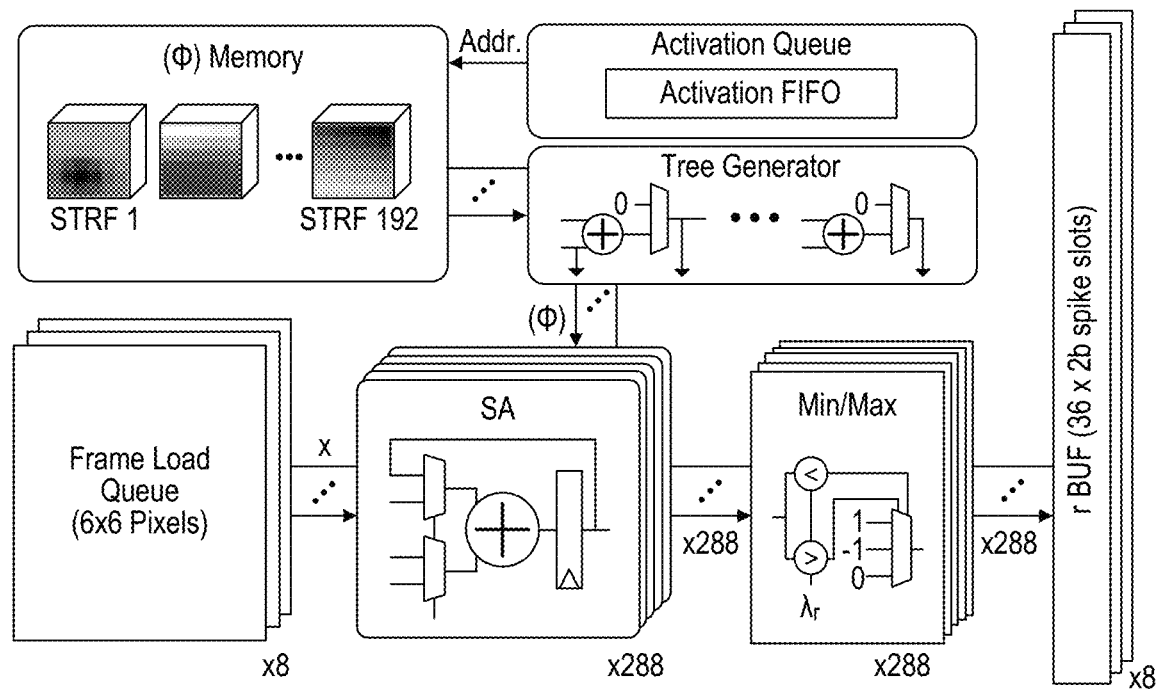
FIG. 7 is a diagram further illustrating the residual layer design of the video inference processor.

In architecting the residual layer, an array of V SAs (V=288 in the example embodiment) is employed as the compute engine, as illustrated in FIG. 7. The SA array computes the reconstruction $\hat{x}$ (V×T) by multiplying $\Phi$ (V×N) by a (N×T). The input a is provided one column at a time as spikes from the activation layer. For each column of a, a spike detector is used to find the address of the first entry that is 1. Once found, the entry is popped and the spike detector looks for the next entry that is 1. The spike detector provides the addresses of nonzero entries to the dictionary memory to read the corresponding STRFs, which are accumulated by the SA array for computing the reconstruction, as shown in FIG. 7; the reconstruction is subsequently subtracted from the input; and finally, the results are rectified to obtain the residuals. The reconstruction is computed column by column, and consequently the residuals are obtained column by column and sent to the charge layer in this order.

Figure 8:
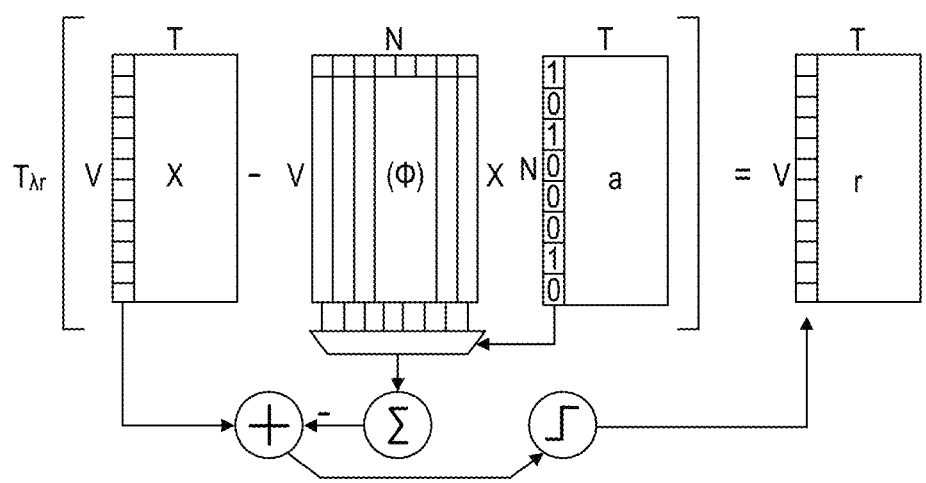
FIG. 8 is a simplified visualization of a residual compute.

As illustrated in FIG. 8, suppose in processing column i of a, the spike detector outputs j as the first entry in column i that is then 1, then column j of $\Phi$ is read from memory, decompressed by the tree generator, and accumulated by the SA array as the temporary output of column i of $\hat{x}$. The process continues with the spike detector providing the next nonzero entry.

The spike detector skips zeros to enable improvements in both performance and power. If the entire column j of a is zero, the column j of the reconstruction x is also zero, and the majority of the residual layer processing is skipped. This approach is called layer skipping. Experiments with the KTH Dataset show that layer skipping is effective in reducing the residual layer processing latency by 6.3× and its power consumption by 3.5× in the example embodiment.

Clock gating can be used in conjunction with spike detection to save additional power. When no spikes are present, the compute is idle and the clock is gated to save clocking power. Clock gating is especially effective when processing sparse data, as evidence in the example embodiment where power is reduced by 4.2×.

Figure 9:
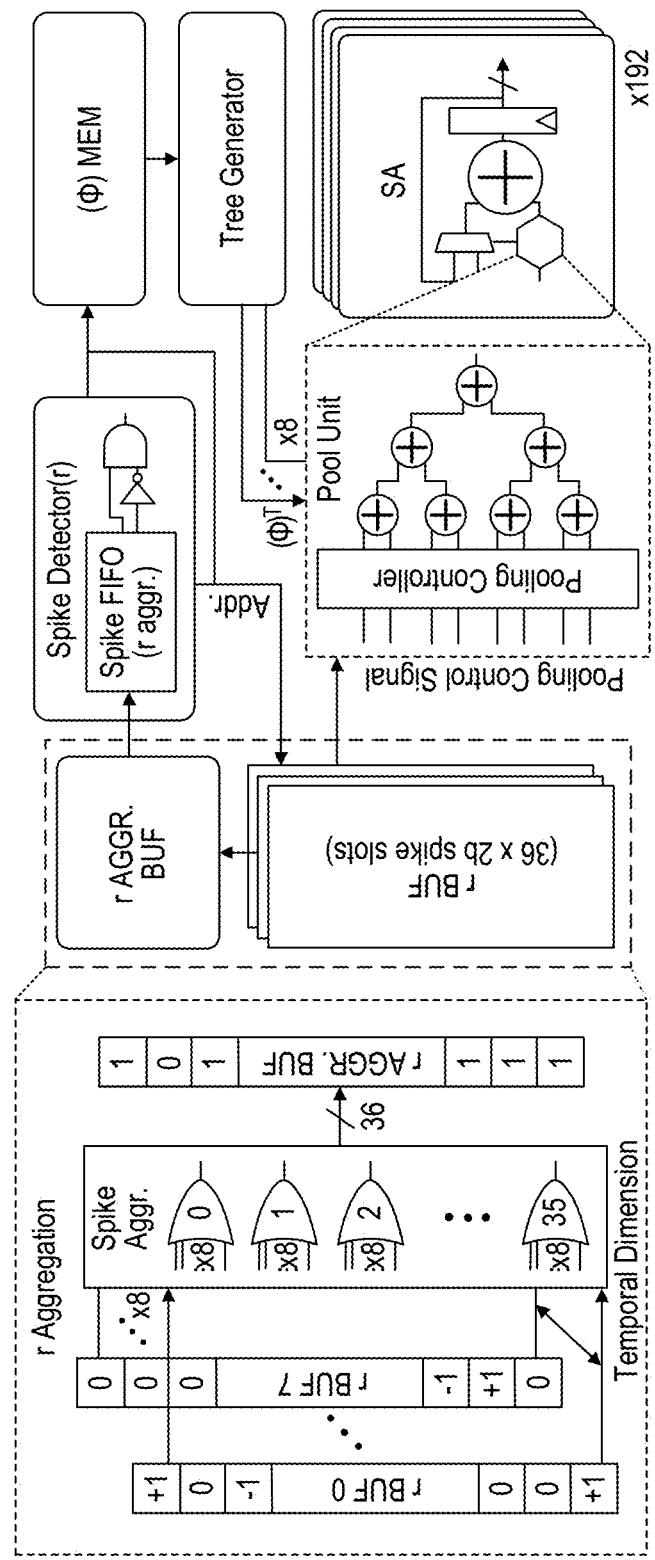
FIG. 9 is a diagram further illustrating the charge layer design for the video inference processor.

In architecting the charge layer, an array of N SAs (N=192 in the prototype design) is employed, as illustrated in FIG. 9, to compute the charge c by multiplying $\Phi^T$ (N×V) by r (V×T). The charge layer processes r column by column, in the same order that is received by this layer.

Note that r is a collection of ternary spikes {0, −1, 1}, and the majority of the entries are 0. Each column of r represents a (X×Y×D) frame. To increase performance, we pool D frames to one. If at least one pixel among all the pixels at the same location in the XY-plane across the D frames is nonzero, pooling will output 1 for the pixel. After pooling, each entry of $r_a$ represents an "aggregated" pixel i (in the XY-plane) across D frames, as shown in FIG. 9.

Figure 10:
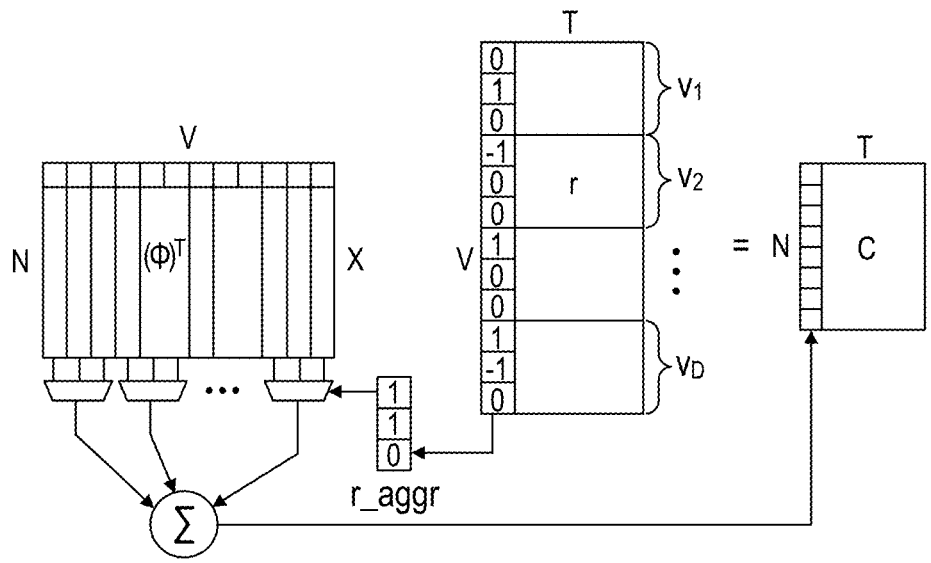
FIG. 10 is a simplified visualization of charge compute.

A key benefit of pooling is that it enables aggregated processing to increase performance. As shown in FIG. 9, $r_a$ is passed to a spike detector to output the first entry that is nonzero. Graphically illustrated in FIG. 10, suppose the spike detector outputs address i (in the XY-plane). Then, the address is used to read the D columns of $\Phi^T$ that correspond to pixel i, and the D r values that are associated with pixel i. The D columns of $\Phi^T$ are summed to one by the pool units, as shown in FIG. 9, with the D r values as the control bits that determine whether the respective columns are zero'ed, added or subtracted. Using aggregated processing, the latency and performance are improved by a factor of D.

Potential updates $\Delta u$ (N×T) are accumulated in the activation layer to compute new neuron potentials. $\Delta u$ is received column by column, and the activation layer uses N accumulators (N=192 in the prototype design) to update one column of potentials at a time. The potentials are thresholded to obtain binary activations a.

Figure 11:
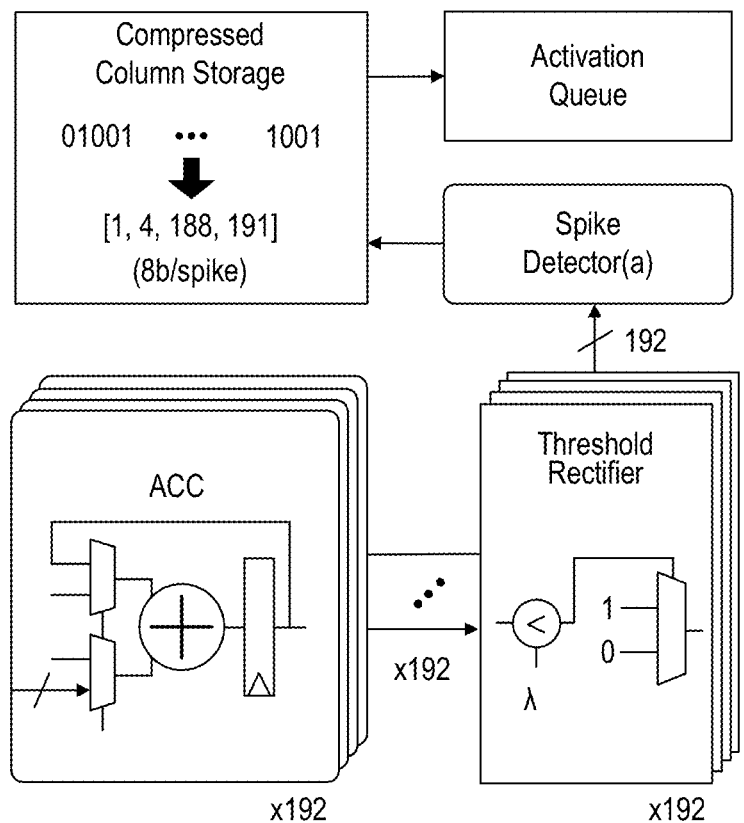
FIG. 11 is a diagram further illustrating the activation layer design for the video inference processor.

The activations a (N×T) are binary and sparse. As described above, a is fed to a spike detector to locate the nonzero entries for processing in the residual layer. The spike detector can be used to encode a in a compressed column storage (CCS), referring to storing only the addresses of nonzero entries in every column, as illustrated in FIG. 11.

In the example embodiment, we limit the storage to 8 nonzero entries of a in a column (based on the average density of $S_a$=1% and N=192 and 4×margin). Additional nonzeros entries are dropped with negligible impact on the accuracy due to the extremely low likelihood of occurrence. CCS effectively reduces the storage by 64% to 84% in the example embodiment when processing the KTH Dataset.

Figure 12:
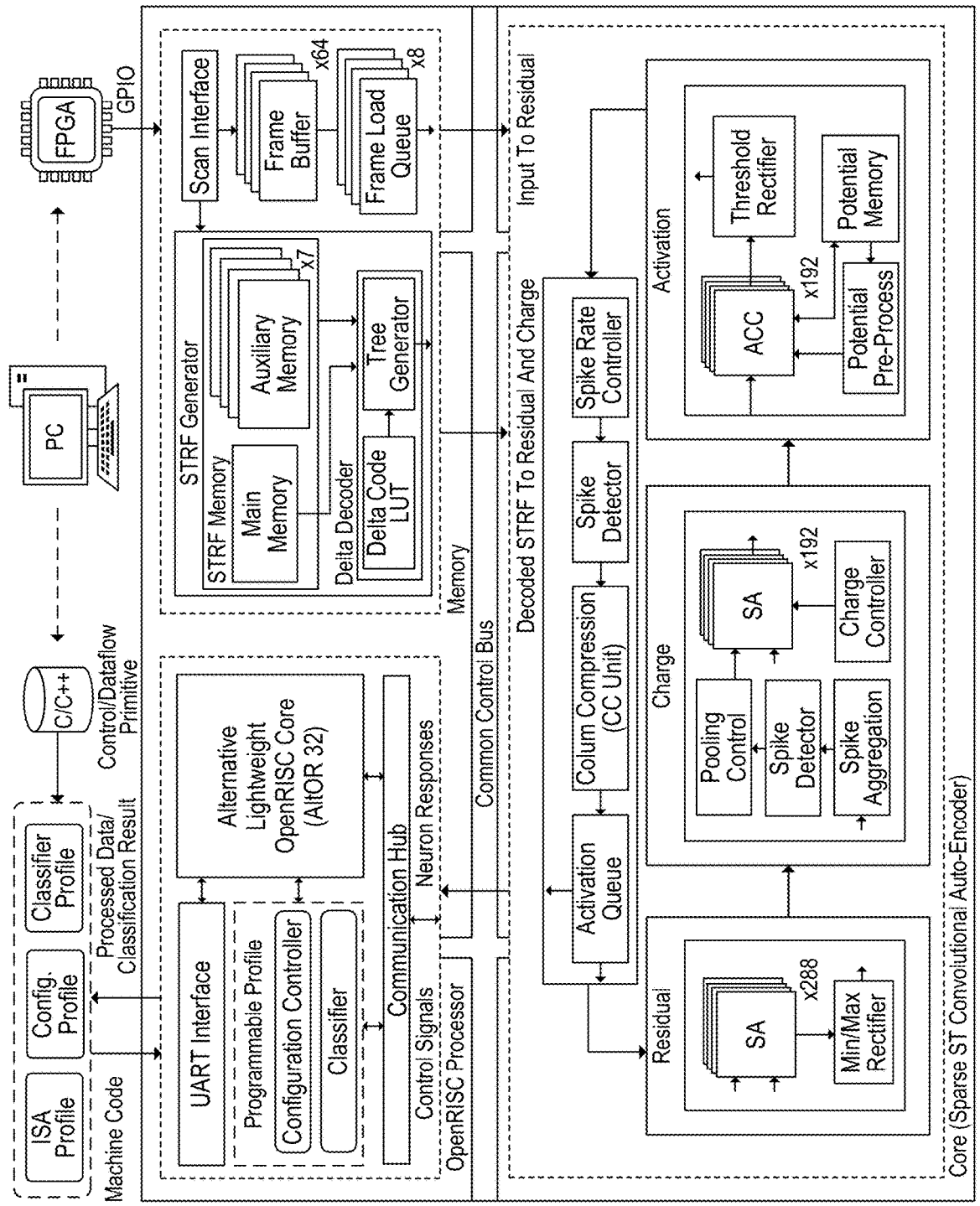
FIG. 12 is a block diagram of a system-level design of the video inference processor.

As proof of concept, a prototype chip was designed to demonstrate the efficient designs for video inference applications. The system level design is shown in FIG. 12. The core of the chip is the video inference processor that is made of three compute layers. The chip also consists of an OpenRISC processor and memory to store dictionary, input video frames for testing, and neuron potentials. The core is integrated with memory and an OpenRISC processor through a common control bus. The OpenRISC processor is programmed by an instruction set together with a configuration and a classifier profile. The configuration profile controls the operation of the core during runtime; and the classifier profile configures the on-chip classification algorithm. The outputs of the core are sent to a communication hub in the OpenRISC processor.

Through the OpenRISC processor, the video inference processor is configurable with several settings: 64, 128 or 192 neurons (N), frame size (X×Y) from 1 to 36 and depth (D) from 1 to 8. Inputs are streamed in to the frame load queue, and dictionary elements are recovered from their compressed storage prior to performing compute.

Figure 13:
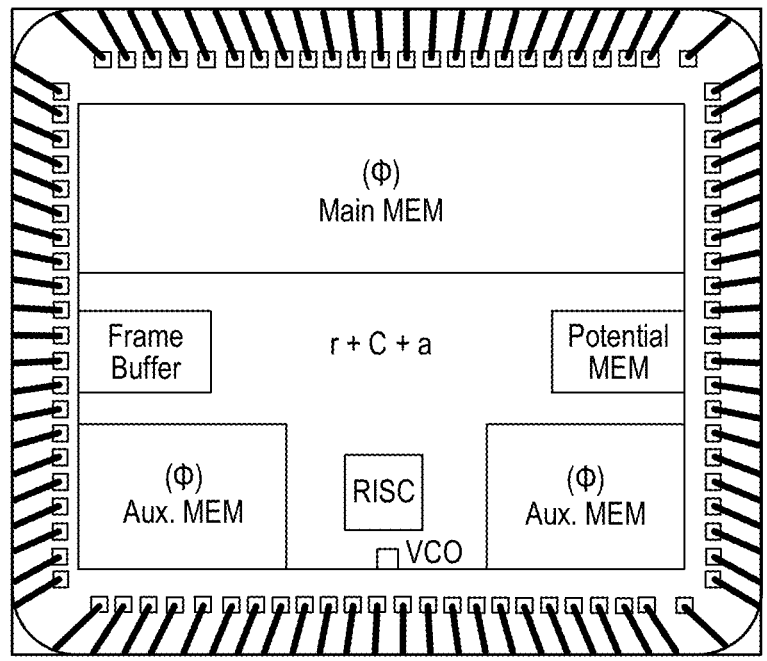
FIG. 13 is a microphotograph of the video inference chip in 40 nm CMOS.
Figure 14:
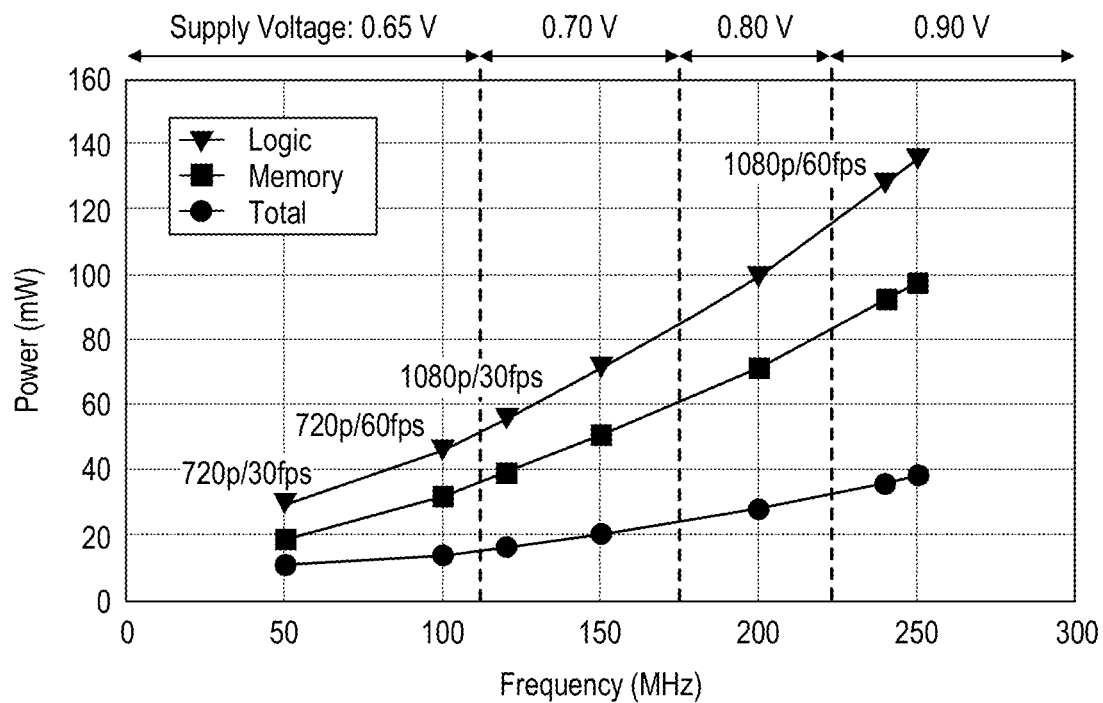
FIG. 14 is a graph showing measured power and performance of the video inference chip.

The video inference chip is implemented in 40 nm CMOS, occupying 3.98 $mm^2$. The chip microphotograph is shown in FIG. 13. The chip achieves an effective 1.63 tera operations per second (TOPS) with 0.9V supply at 240 MHz. The performance meets the 60 frames per second (fps) 1920×1080 HD video data rate, while dissipating 127 mW. The measured power and performance at room temperature are shown in FIG. 14.

The 6-class KTH Human Action Dataset is used for action classification testing (600 samples with train/test split ration of 5:1). With the core extracting the activated STRFs, a soft-max classifier implemented on the OpenRISC processor achieves a 76.7% classification accuracy. Using the same outputs, an off-chip support vector machine (SVM) classifier achieves an 82.8% accuracy as shown below in Table IV.

TABLE IV

|  | Boxing | Clapping | Waving | Jogging | Running | Walking | Average |
| --- | --- | --- | --- | --- | --- | --- | --- |
| On-chip softmax classifier | 70.0% | 68.4% | 85.0% | 73.7% | 94.4% | 70.0% | 76.7% |
| Off-chip SVM classifier | 85.0% | 78.9% | 85.0% | 73.7% | 94.4% | 80.0% | 82.8% |

Motion tracking is also prototyped using a simple bounding box regression method based on the core outputs. Compared to state-of-the-art vision processors, this design offers enhanced capabilities of action classification and motion tracking using a recurrent network. The design exploits sparse spikes to effectively reduce workload, demonstrating competitive performance and efficiency. The sparse video inference processor is suitable for a range of cognitive processing tasks.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A video inference processor that extracts features from a video, comprising:
   a plurality of neurons interconnected to form a recurrent neural network implemented in hardware, each neuron is configured to store in memory a receptive field;
   a residual layer configured to receive a video input and output from an activation layer, wherein the residual layer reconstructs the video input from the output from the activation layer, subtracts the reconstructed input from the video input to yield a residual and quantizes values of the residual; and
   a charge layer configured to receive the quantized values of the residual from the residual layer and operates to project the quantized values of the residual onto the plurality of receptive fields and thereby yield potential update values for the plurality of neurons, wherein the residual layer quantizes values of the residual as either a one, zero or negative one;
   wherein the activation layer is configured to receive the potential update values for the plurality of neurons from the charge layer and operates to accumulate the potential update values and threshold potential values for the plurality of neurons to generate a set of binary outputs, wherein the set of binary outputs is fed back to the residual layer.

2. The video inference processor of claim 1 wherein the video input is a time series of video segments taken from a video, and each receptive field in the plurality of receptive fields represents a time series of video segments.

3. The video inference processor of claim 1 wherein the residual layer reconstructs the video input by summing the receptive fields that are activated in the output from the activation layer.

4. The video inference processor of claim 1 wherein the residual layer reconstructs the input video using only select accumulate operations and without multiplication operations.

5. The video inference processor of claim 1 wherein the residual layer is implemented in hardware using multiplexers, adders and registers.

6. The video inference processor of claim 1 wherein the residual layer quantizes values of the residual by comparing each value of the residual to an upper threshold and a lower threshold, such that the upper threshold and lower threshold are selected to maximize sparsity of neuron activation and encoding accuracy.

7. The video inference processor of claim 1 wherein the charge layer projects quantized values of the residual into the plurality of receptive fields using only select accumulate operations and without multiplication operations.

8. The video inference processor of claim 1 wherein the charge layer is implemented in hardware using multiplexers, adders and registers.

9. The video inference processor of claim 1 wherein the charge layer compresses the quantized values of the residual by aggregating quantized values of a given pixel across video segments.

10. The video inference processor of claim 1 wherein the activation layer identifies nonzero entries in the set of binary outputs and encodes an address for the identified nonzero entries to form a compressed output, wherein the compressed output is fed back to the residual layer.

11. A video inference processor that extracts features from a video, comprising:
    a plurality of neurons interconnected to form a neural network and implemented in hardware, where each neuron represents a spatio-temporal feature in a video;
    a residual layer configured to receive a video input and an output from an activation layer, wherein the residual layer reconstructs the video input by summing the spatio-temporal features of neurons in the recurrent neural network that are activated in the output from the activation layer and subtracts the reconstructed input from the video input to yield a residual;

wherein the residual layer further operates to quantize values of the residual as either a one, zero or a negative one;

a charge layer configured to receive the quantized values of the residual from the residual layer, wherein the charge layer operates to project the quantized values of the residual onto a feature space defined by the plurality of neurons and thereby yield potential update values for the plurality of neurons;

wherein the activation layer is configured to receive the potential update values for the plurality of neurons from the charge layer, the activation layer operates to accumulate the potential update values and threshold potential values for the plurality of neurons to generate an output, such that the output is fed back to the residual layer.

12. The video inference processor of claim 11 wherein the residual layer reconstructs the input video using only select accumulate operations and without multiplication operations.

13. The video inference processor of claim 11 wherein the residual layer is implemented in hardware using multiplexers, adders and registers.

14. The video inference processor of claim 11 wherein the residual layer quantizes values of the residual by comparing each value of the residual to an upper threshold and a lower threshold.

15. The video inference processor of claim 11 wherein values for the upper threshold and the lower threshold are selected to maximize sparsity of neuron activation and encoding accuracy.

16. The video inference processor of claim 11 wherein the charge layer projects quantized values of the residual into the plurality of receptive fields using only select accumulate operations and without multiplication operations.

17. The video inference processor of claim 11 wherein the charge layer is implemented in hardware using multiplexers, adders and registers.

18. The video inference processor of claim 11 wherein the video input is a time series of video segments taken from a video and the charge layer compresses the quantized values of the residual by aggregating quantized values of a given pixel across video segments.

19. The video inference processor of claim 11 wherein the activation layer identifies nonzero entries in the output of the activation layer and encodes an address for the identified nonzero entries to form a compressed output, wherein the compressed output is fed back to the residual layer.

20. A video inference processor that extracts features from a video, comprising:

a plurality of neurons interconnected to form a recurrent neural network implemented in hardware, each neuron is configured to store in memory a receptive field;

a residual layer configured to receive a video input and output from an activation layer, wherein the residual layer reconstructs the video input from the output from the activation layer, subtracts the reconstructed input from the video input to yield a residual and quantizes values of the residual; and a charge layer configured to receive the quantized values of the residual from the residual layer, wherein the charge layer operates to project the quantized values of the residual onto the plurality of receptive fields using only select accumulate operations and without multiplication operations and thereby yield potential update values for the plurality of neurons;

wherein the activation layer is configured to receive the potential update values for the plurality of neurons from the charge layer and operates to accumulate the potential update values and threshold potential values for the plurality of neurons to generate a set of binary outputs, wherein the set of binary outputs is fed back to the residual layer.

21. The video inference processor of claim 20 wherein the residual layer reconstructs the video input by summing the receptive fields that are activated in the output from the activation layer.

22. The video inference processor of claim 20 wherein the residual layer reconstructs the input video using only select accumulate operations and without multiplication operations.

23. The video inference processor of claim 20 wherein the activation layer identifies nonzero entries in the set of binary outputs and encodes an address for the identified nonzero entries to form a compressed output, wherein the compressed output is fed back to the residual layer.

24. A video inference processor that extracts features from a video, comprising:

a plurality of neurons interconnected to form a recurrent neural network implemented in hardware, each neuron is configured to store in memory a receptive field;

a residual layer configured to receive a video input and output from an activation layer, wherein the residual layer reconstructs the video input from the output from the activation layer, subtracts the reconstructed input from the video input to yield a residual and quantizes values of the residual; and a charge layer configured to receive the quantized values of the residual from the residual layer and operates to project the quantized values of the residual onto the plurality of receptive fields and thereby yield potential update values for the plurality of neurons, wherein the charge layer compresses the quantized values of the residual by aggregating quantized values of a given pixel across video segments;

wherein the activation layer is configured to receive the potential update values for the plurality of neurons from the charge layer and operates to accumulate the potential update values and threshold potential values for the plurality of neurons to generate a set of binary outputs, wherein the set of binary outputs is fed back to the residual layer.

25. The video inference processor of claim 24 wherein the residual layer reconstructs the video input by summing the receptive fields that are activated in the output from the activation layer.

26. The video inference processor of claim 24 wherein the residual layer reconstructs the input video using only select accumulate operations and without multiplication operations.

27. The video inference processor of claim 24 wherein the charge layer projects quantized values of the residual into the plurality of receptive fields using only select accumulate operations and without multiplication operations.

28. The video inference processor of claim 24 wherein the activation layer identifies nonzero entries in the set of binary outputs and encodes an address for the identified nonzero entries to form a compressed output, wherein the compressed output is fed back to the residual layer.

* * * * *